G. A. JOHNSTONE.
SLIP INDICATOR.
APPLICATION FILED APR. 30, 1908.
941,418.
Patented Nov. 30, 1909.
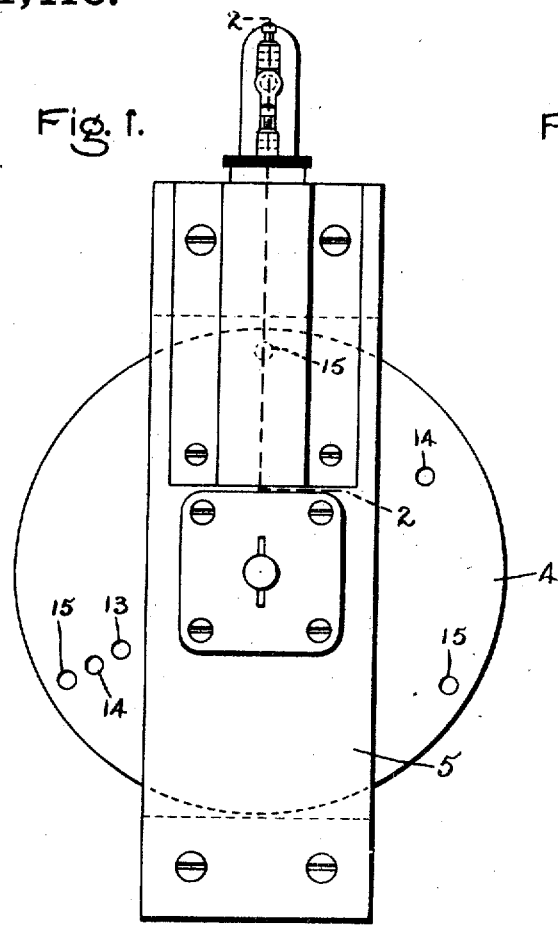
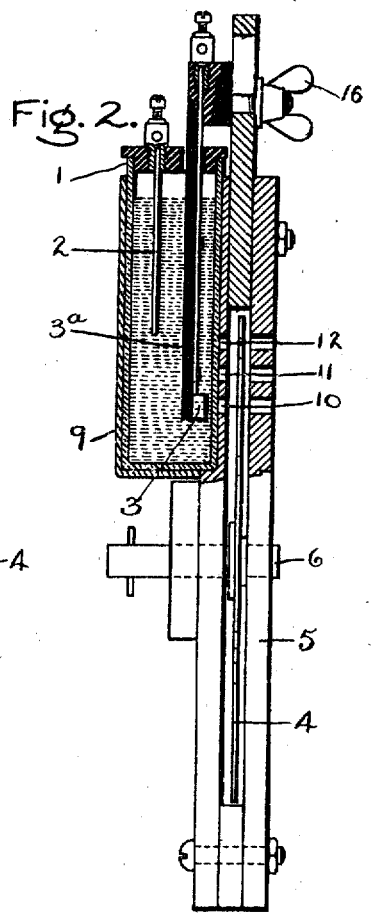
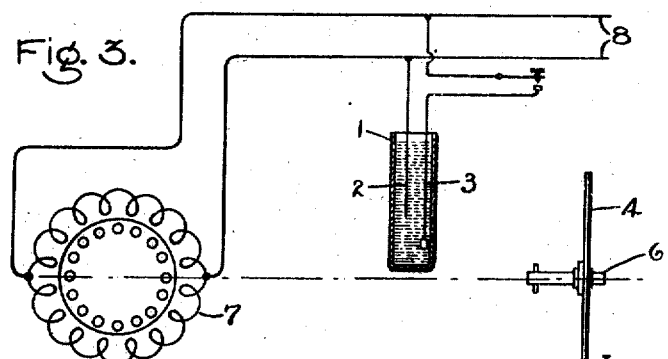
Witnesses:
Inventor,
George A. Johnstone,
By
Att'y

UNITED STATES PATENT OFFICE.

GEORGE A. JOHNSTONE, OF REVERE, MASSACHUSETTS, ASSIGNOR TO GENERAL ELECTRIC COMPANY, A CORPORATION OF NEW YORK.

SLIP-INDICATOR.

941,118.  Specification of Letters Patent.  Patented Nov. 30, 1909.

Application filed April 30, 1908. Serial No. 430,072.

*To all whom it may concern:*

Be it known that I, GEORGE A. JOHNSTONE, a subject of the King of Great Britain, residing at Revere, county of Essex, State of Massachusetts, have invented certain new and useful Improvements in Slip-Indicators, of which the following is a specification.

My invention relates to stroboscopic slip indicators for induction motors and its object is to provide a simple and self-contained indicator easily adjusted to any induction motor for determining its slip and capable of use with different motors having different numbers of poles.

In carrying out my invention a source of light which varies in brightness with each cycle of the supply circuit of the motor is periodically exposed to the observer at intervals which vary in frequency with the speed of the motor. The periodic exposure may be secured by screening the source of light from the observer by a rotary shutter driven in synchronism with the motor and having an opening which enables the observer to see the source of light only when the shutter is in a predetermined position. If the motor is running without slip the source of light will always be at the same stage of its variation when exposed to the observer and will appear steady, but if the motor is slipping the successive exposures take place at different stages of variation of the light which appears to pass through its entire range of variation at a rate dependent on the amount of slip. The preferred source of light is an electrolytic cell, preferably one having an electrode of an alloy containing aluminum, since such an electrode in an alkaline electrolyte will become illuminated when an alternating voltage of from one hundred to two hundred volts is applied, the luminosity appearing and disappearing during each cycle at the aluminum electrode, which is placed in a position to register with the opening in the rotating shutter and is periodically exposed to the observer by the rotation of the shutter.

My invention will best be understood in connection with the accompanying drawings which are merely illustrative of one form in which the invention may be embodied and in which—

Figure 1 is a plan view of a slip indicator; Fig. 2 is a side view partly in section along the line 2 2 of the device shown in Fig. 1; and Fig. 3 is a diagrammatic view showing the relation of the electrolytic cell and the rotating shutter to the supply circuit and the induction motor.

In the form of the device shown in the drawings the variable source of light is an electrolytic cell which comprises a glass vessel 1 containing an alkaline electrolyte in which the aluminum electrodes 2 and 3 are immersed. The electrode 2 is small and is made of pure aluminum to diminish the heating while the electrode 3, which is the source of light, is preferably made from an alloy of aluminum which becomes brightly illuminated during each cycle, the electrode being made in the form of a plate and mounted upon a backing or support 3ª of any suitable insulating material.

In preparing the cell the electrodes are first thoroughly coated by applying a relatively high voltage for some time and the face of the plate electrode 3 is then cleaned of the coating to increase the illumination at normal voltages. The electrode 3 or other source of light is normally concealed from the observer by a movable shutter, which is shown in the form of a rotatable disk 4 mounted in a framework 5 on a shaft 6 driven in any suitable manner in synchronism with the induction motor 7 which, as shown in Fig. 3, is energized from the alternating current supply circuit 8 across which the electrodes 2 and 3 are connected through a hand switch. The electrolytic cell is preferably inclosed in an opaque casing 9 forming part of the framework 5 and having in one side a series of openings or peep-holes 10, 11 and 12 with which the source of light or disk electrode 3 may be brought into registry. The movable shutter or disk 4 has a small slit or peep hole preferably in the form of a circular opening 13 which comes into registry with the opening 10 and the source of light at each revolution of the disk.

The device above described is adapted for measuring the slip of induction motors and its operation will best be understood in connection with a motor of the two-pole type. The electrode 3 becomes bright and then dark during each cycle on the supply circuit 8 to which it is connected and if the motor is running without slip the opening 13 in the shutter will register with the opening 10 in the casing and always expose the electrode 3 to the observer at the same stage in its variation in luminosity. If the electrode is first exposed when it is bright, it will die down and again become bright by the time the disk makes one revolution and again exposes it, and the light will therefore appear steady. If the motor is slipping and the first revolution of the shutter exposes the electrode when it is bright, the next exposure will take place later in the cycle, after the intensity of the illumination on the electrode has begun to diminish, and since this action is cumulative the electrode is eventually exposed to the observer at every stage of its variation in brightness. The length of the interval between each exposure and therefore the extent of change in the appearance of the source of light since the preceding exposure depends on the amount of slip, hence the length of time apparently required for the electrode to complete its cycle of illumination is a measure of the slip of the motor. In practice the determination is made most easily by noting the number of times the electrode appears bright during a definite period of observation.

Since the speed of an induction motor varies inversely with the number of pairs of poles, it is necessary to make some provision when the device is used with a motor having more than two poles for exposing by any suitable mechanism the electrode or other source of light with the same frequency as in the case of a two pole motor, and where the disk or shutter 4 is driven at the same speed as the motor shaft the electrode is exposed in the four pole motor twice and in a six-pole motor three times during each revolution of the motor shaft. This result may be accomplished by driving the disk at twice the speed of the shaft of a four-pole motor and at three times the speed of the shaft of a six pole motor, but the preferred arrangement is that shown in the drawing in which the disk or shutter is provided with two peep-holes or openings 14 diametrically opposite each other on the circumference of a circle concentric with the axis of the disk 4 and arranged to register with the opening 11 in the casing, and also with three openings or peep-holes 15 placed 120° apart on another circle concentric with the axis of the disk 4 and arranged to register with the opening 12 in the casing. The electrode 3 is made adjustable and is brought into registry with any one of the openings 10, 11 or 12 by means of a thumb-screw 16, which is attached to the insulating bushing 3ª and projects through a slot in the framework. When the shutter 4 is directly connected to the shaft of a four-pole induction motor the electrode is adjusted to come into registry with the opening 11 and the openings 14, so that the source of light is exposed twice during each revolution of the motor shaft, while with a six-pole motor the electrode is placed in front of the opening 12 in registry with the openings 15 and is exposed three times during each revolution of the motor shaft.

My invention may be embodied in many other forms than shown and described and I therefore do not wish to be restricted to the exact form shown but intend to cover by the appended claims all changes and modifications within the spirit and scope of my invention.

What I claim as new and desire to secure by Letters Patent of the United States, is,—

1. In a visual slip indicator for induction motors, the combination with a source of light which varies in intensity in synchronism with an alternating current circuit, of means for exposing said source of light at intervals varying in frequency with the speed of an induction motor connected to the alternating current circuit.

2. In a visual slip indicator for induction motors, the combination with a source of light which varies in intensity in synchronism with an alternating current circuit, of a movable shutter actuated by an induction motor connected to the alternating current circuit and arranged to momentarily expose said source of light at intervals varying in frequency with the speed of the motor.

3. In a visual slip indicator for an induction motor, the combination with a source of light which varies in intensity in synchronism with an alternating current circuit, of a rotary shutter driven in synchronism with an induction motor connected to the alternating current circuit, said shutter having an opening for intermittently exposing said source of light.

4. In a visual slip indicator for induction motors, the combination with a source of light which varies in intensity in synchronism with an alternating current circuit, of means for making during one revolution of an induction motor connected to an alternating current circuit a series of exposures of said source of light, said exposures being proportional in number to the number of poles of the motor.

5. In a visual slip indicator for induction motors, the combination with a source of light which varies in intensity in synchronism with an alternating current circuit, of a shutter moved at a rate dependent on the speed of an induction motor connected to an alternating current circuit, said shutter having openings arranged in lines equal in number to the various numbers of pairs of poles used in induction motors, the number of openings in each line being proportional to a different number of poles, and means for varying the relation of said source of light to said lines of openings in said shutter to make during one revolution of the motor a series of exposures of said source of light, said exposures being proportional in number to the number of poles of said motor.

6. In a visual slip indicator for induction motors, the combination with a source of light which varies in intensity in synchronism with an alternating current circuit, of a rotary shutter rotated in synchronism with an induction motor connected to the alternating current circuit and having openings arranged in concentric circles with a different number of openings in each circle, and means for moving said source of light and said shutter relatively to each other to bring said source of light into registry with the openings in any one of said circles.

7. In a visual slip indicator for induction motors, the combination with an electrolytic cell having an electrode which varies in luminosity in synchronism with an alternating current circuit, of means for exposing said electrode at intervals varying in frequency with the speed of an induction motor connected to the alternating current circuit.

8. In a visual slip indicator for induction motors, the combination with an electrolytic cell having an electrode which varies in luminosity in synchronism with an alternating current circuit, of a casing for said cell with an opening for exposing said electrode, a shutter for said opening driven in synchronism with the motor to expose said electrode at intervals varying in frequency with the speed of said motor.

9. In a visual slip indicator for induction motors, the combination with an electrolytic cell having an electrode which varies in luminosity in synchronism with an alternating current circuit, of a rotary shutter driven in synchronism with an induction motor connected to the alternating current circuit, said shutter having an opening which intermittently registers with said electrode to expose it.

10. In a visual slip indicator for induction motors, the combination with an electrolytic cell having an electrode which varies in luminosity in synchronism with an alternating current circuit, of a rotary shutter driven in synchronism with an induction motor connected to the alternating current circuit, said shutter having openings arranged in concentric circles, and means for moving said electrode and said shutter relatively to each other to bring said electrode into registry with the openings in any one of said circles.

In witness whereof, I have hereunto set my hand this twenty seventh day of April, 1908.

GEORGE A. JOHNSTONE.

Witnesses:
JOHN A. McMANUS, Jr.,
CHARLES E. HARTHAN.